Dec. 26, 1922.　　　　　　　　　　　　　　　　1,440,278
J. CHOCHOL.
AUTOMOBILE LOCKING DEVICE.
FILED JULY 23, 1921.
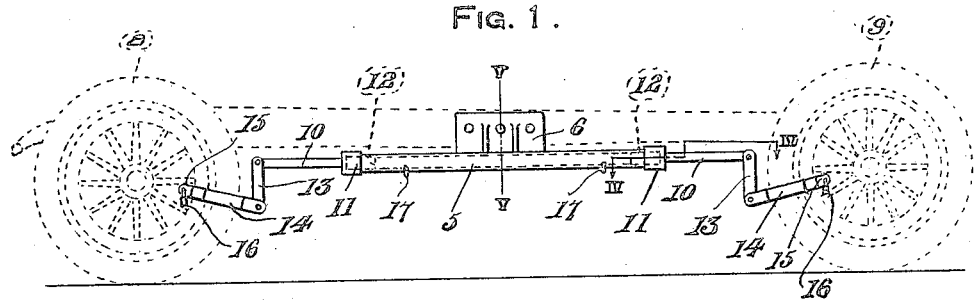
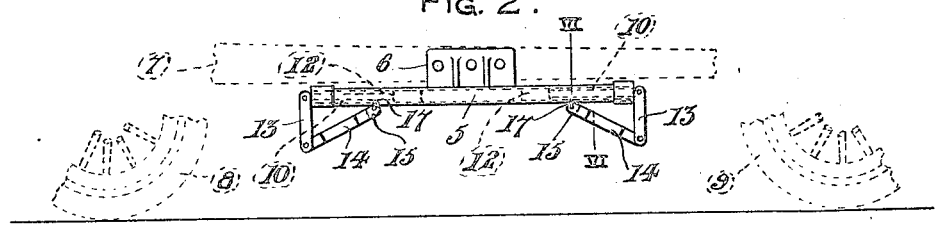
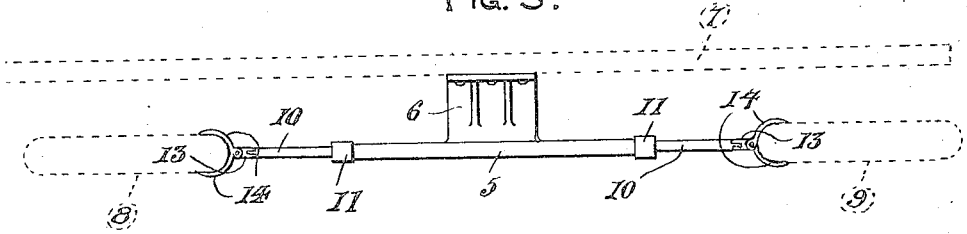
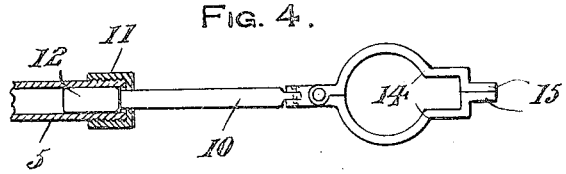
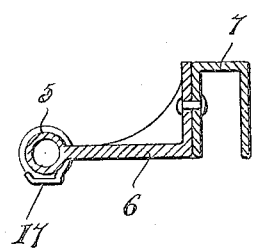
Inventor
J. Chochol
By F. K. Bryant
Attorney Patented Dec. 26, 1922.

1,440,278

UNITED STATES PATENT OFFICE.

JOSEPH CHOCHOL, OF CHICAGO, ILLINOIS, ASSIGNOR OF ONE-HALF TO ANTON HOHOL, OF NIAGARA, ILLINOIS.

AUTOMOBILE LOCKING DEVICE.

Application filed July 23, 1921. Serial No. 487,030.

*To all whom it may concern:*

Be it known that I, JOSEPH CHOCHOL, a citizen of Poland, residing at Chicago, in the county of Cook and State of Illinois, have invented certain new and useful Improvements in Automobile Locking Devices, of which the following is a specification.

This invention relates to certain new and useful improvements in automobile locking devices, and has particular reference to the provision of improved means for locking an automobile against theft or use by an unauthorized person.

The invention primarily provides improved means supported by the chassis of an automobile beneath the running board of the latter for operatively engaging the front and rear supporting wheels at one side of the automobile so as to restrain said wheels against rotation.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a lock constructed in accordance with the present invention shown operatively associated with an automobile, a portion of which is indicated by dotted lines, Figure 2 is a view similar to Figure 1 with the parts of the lock inoperatively disposed, Figure 3 is a top plan view of the device shown in Fig. 1, Figure 4 is an enlarged sectional view taken upon line IV—IV of Fig. 1, Figure 5 is an enlarged vertical sectional view taken upon line V—V of Fig. 1, and Figure 6 is a sectional view taken upon line VI—VI of Fig. 2 and shown on a larger scale.

Referring more in detail to the several views, the present invention includes a tube 5 rigidly supported in a horizontal position beneath the running board of an automobile by means of a central bracket 6 which is riveted or otherwise secured to the chassis or frame bar 7 of the automobile so that said tube extends longitudinally of the latter, the tube 5 being of such length as to terminate in spaced relation to the adjacent front and rear supporting wheels 8 and 9 respectively of the automobile.

A rod 10 is slidably disposed in each end of the tube 5, and is confined in said tube by means of a cap 11 having an end aperture of lesser size than the size of the head 12 provided upon the inner end of said rod 10, the combined lengths of the rods 10 being substantially equal to the length of the tube 5 or less than the length of said tube as shown in Fig. 2. A link 13 is pivoted to the outer end of each rod 10 and this link is also pivoted to a clamp composed of a pair of hinged sections 14 which are formed to embrace the tire and felly of the adjacent wheel and to include a pair of mating ears 15 through which the shackle of a padlock 16 may be inserted so as to retain the clamp sections in engagement with the wheel and thereby prevent turning of the same. A resilient clip 17 is fixed to the tube 5 near each end of the same so as to engage the ears 15 of the adjacent clamp for holding the latter off of the ground when the latter is not in use, at which time the rods 10 are forced inwardly within the tube 5.

In operation, the clamps are disengaged from the resilient clips 17 and the rods 10 are withdrawn from the tube 5 so that said clamps may be readily engaged with the wheels as shown in Fig. 1 with a padlock associated with each clamp. The wheels are thus effectively held against rotation, and liability of theft of the automobile is reduced to a minimum by means of a simple and durable form of locking device.

While there is herein shown and described the preferred embodiment of the present invention it is nevertheless to be understood that minor changes may be made therein without departing from the spirit and scope thereof as claimed.

What is claimed as new is:—

1. An automobile lock of the class described including a tube, means to readily mount said tube at one side of the automobile longitudinally of the latter, a pair of rods slidable in the ends of said tube, a pair of clamps carried by said rods adapted to engage the adjacent wheels of the automobile when the rods are extended, locking means for said clamps, and means carried by said tube to retain said clamps against swinging movement when the rods are disposed within said tube.

2. An automobile lock of the class described including a tube, a pair of rods slidable in the ends of said tube, links pivoted to the outer end of said rods, clamps including hinged sections pivoted to said links, locking means for the sections of said clamps, and means to hold said clamps against swinging in a position beneath the tube and extending toward each other when the rods are disposed within said tube and the lock not required for use, said means comprising spring clips carried by the opposite ends of the tube and adapted to be received in alined openings in the ends of the clamp sections.

In testimony whereof I affix my signature.

JOSEPH CHOCHOL.